Nov. 28, 1950      J. F. CHURCH      2,531,725
PEBBLE HEATER PROCESS
Filed Jan. 5, 1948
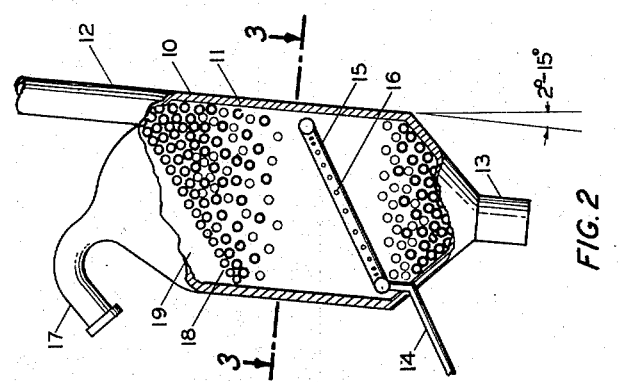
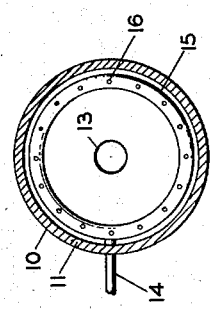
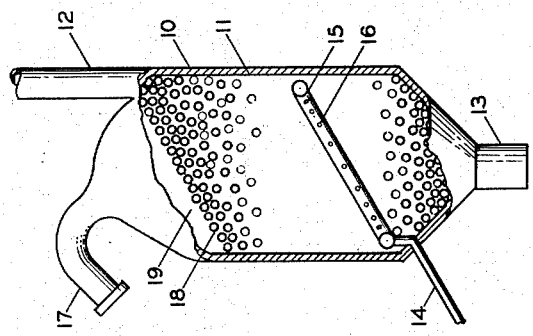
INVENTOR.
J. F. CHURCH
BY *Hudson & Young*
ATTORNEYS Patented Nov. 28, 1950

2,531,725

UNITED STATES PATENT OFFICE 2,531,725

PEBBLE HEATER PROCESS

J. Frank Church, Bartlesville, Okla., assignor to Phillips Petroleum Company, a corporation of Delaware Application January 5, 1948, Serial No. 592

4 Claims. (Cl. 196—55)

This invention relates to improved pebble heater design and to methods for effecting improved pebble flow through a pebble heater reactor or furnace. A specific aspect of the invention pertains to an improved process for the vapor phase conversion of hydrocarbons in a pebble heater unit.

Pebble heater type apparatus is finding increasing favor in heating gases and in effecting various chemical conversion processes at elevated temperature, especially hydrocarbon conversion reactions. Pebble heater operation entails heating a descending mass of refractory pebbles in an upper heating chamber by contact with hot flue gases, allowing the hot pebbles to descend through a narrow throat (or throats) into a lower chamber wherein the hot pebbles pass usually in countercurrent contact with a stream of gas to be heated and/or reacted. The pebble stream emerges from the bottom of the reactor or furnace and flows downwardly to the lower part of a pebble elevator which elevates the pebbles to the upper end of a chute leading into the upper part of the pebble heating chamber. A pebble heater unit may include a pebble preheating chamber positioned above the pebble heating chamber wherein the pebbles are preheated by contact with the reaction effluent from the reactor, thereby quenching the same and recovering sensible heat therefrom. Some pebble heater installations also include a pebble cooling chamber positioned below the reactor or furnace through which feed gas or other gas is passed in contact with the pebbles in order to preheat the gas and cool the pebbles before elevation.

The term "pebble" as referred to throughout the specification is defined as any particulate refractory contact material which is readily flowable through a contact chamber at high temperatures. Pebbles are preferably spherical and from about ⅛ inch to 1 inch in size, but spheres ranging in size from about ¼ to ½ inch are the most practical. Uniform shapes and sizes are preferred, but pebbles of irregular shapes and sizes are operable with less efficient results. Pebbles compacted from ceramic material such as alumina, mullite, zirconia, thoria, periclase, synthetic and natural clays, function advantageously in different types of processes. Pebbles may also be made of metals and alloys such as iron, nickel, Monel, and Inconel. Pebbles may be either catalytic or inert in the process being effected.

In a pebble heater unit of conventional design, pebbles are introduced from the pebble heating chamber into the reactor or furnace through a throat axially positioned with respect to said chamber and extending thereinto a substantial distance so as to provide a vapor collecting space above the pebble bed in this chamber. Pebbles are withdrawn from the bottom of the chamber through a funnel shaped bottom with an axial outlet. Application Serial No. 699,666 by H. J. Hepp and M. O. Kilpatrick, filed September 27, 1946, discloses an improved pebble heater reactor or furnace design with improved gas flow characteristics. It was found that in certain types of operation, particularly when effecting the conversion of hydrocarbons at temperatures of about 1500° F. and upwards, considerable carbon deposition occurred around the throat and portions of the upper part of the reaction chamber in contact with sluggish sections of the gas stream flowing through the reactor. It was found that by positioning the pebble inlet at a point near the periphery of the reactor or furnace and shaping the top closure member of the chamber so as to streamline the flow of gases therefrom, much improved gas flow characteristics were exhibited in this design. However, it has been found that the pebble flow in such a design as that described and shown in the application hereinbefore identified is nonuniform, being much faster on a rather direct path from the pebble inlet to the pebble outlet. This uneven pebble flow poses a serious disadvantage in heating gases evenly and, especially, in effecting reactions which require specific temperatures and short reaction time as is obvious to anyone skilled in the art. It is believed that the more rapid pebble flow from the pebble inlet directly to the pebble outlet can be accounted for by the fact that the pebble bed is continuously higher on the side of the bed near the pebble inlet and in addition, the downward pressure of the column of pebbles in the pebble throat leading into the furnace increases the pressure and tendency of the pebbles to flow faster downwardly from the high side of the pebble bed. It is with the improvement of pebble flow through a pebble furnace of the design referred to and the attainment of uniform flow through all sections of the pebble bed in such a furnace that this invention is concerned.

The principal object of the present invention is to provide improved and substantially uniform pebble flow through a pebble furnace or reactor having a pebble inlet near the periphery of the furnace.

Another object is to provide an improved process for effecting the conversion of hydrocarbons in a pebble heater reactor.

Other objects and purposes of the invention will become apparent from a consideration of the accompanying disclosure.

For a more complete understanding of the invention, reference may be had to the drawing of which:

Figure 1 is an elevational view, partially in section, of one modification of the improved pebble heater reactor or furnace disclosed in the copending application referred to hereinbefore.

Figure 2 is a similar view, partially in section, of a pebble heater furnace or reactor illustrating one embodiment of the present invention.

Figure 3 is a cross-section of the apparatus of Figure 2 taken on the line 3—3.

The figures of the drawing are diagrammatic only.

Referring to Figure 1, 10 is a cylindrical furnace or reactor having a metal shell and a refractory lining 11. The refractory lining may comprise a series of layers of refractories and insulating material with super-refractories in the inner layer and less expensive refractories in the outer layer or layers. The reactor has a pebble inlet throat or conduit 12, a pebble outlet 13, axially positioned with respect to the reactor and a top closure member converging into gas outlet 17. The apparatus includes gas inlet means 14 connected to a gas distributor ring 15 having perforations 16 therein for the distribution of feed gas in pebble bed 18. Distribution ring 15 is positioned obliquely within the reactor 10 and generally parallel to the top of pebble bed 18 so that gases flowing through the bed have the same length path in the various sections of the pebble bed. The space between distribution ring 15 and the inner wall of the furnace should be at least four or five pebble diameters in order to permit free flow of pebbles therethrough. Numeral 19 refers to a gas collecting space above the pebble bed which is streamlined and converging into gas outlet 17 so as to avoid eddy currents and sluggish gas flow which results in uneven heating and also carbon deposition on the walls of the chamber when converting hydrocarbons.

In operation of the apparatus shown in Figure 1 a column of hot pebbles at a temperature of at least 100° F. above reaction temperature (or the temperature to which the feed is to be heated) is introduced through inlet 12 into furnace 10 and disperses in a solid, contiguous mass to form a bed 18 flowing downwardly and converging into outlet 13. Any suitable gas to be heated and/or reacted is introduced through line 14 to ring 15 from which the gas is distributed in any suitable direction such as inwardly and upwardly through openings 16. The feed gas thus introduced to the hot pebble bed passes upwardly through the bed in heat exchange relation therewith and is collected in vapor space 19 and outlet 17 for passage to any desirable use or further treatment. Any other suitable gas distribution means may be used in conjunction with the furnace shown in Figure 1. If desired, the gas may be introduced through a series of openings in the conical bottom of the chamber or through the walls of the chamber from a bustle ring surrounding the same. The invention is independent of the manner of introduction of the gas feed to the furnace.

In operation of the apparatus shown in Figure 1, it has been found that the flow rate of pebbles from pebble inlet 12 down the side of the furnace adjacent the inlet and into the outlet 13 exceeds the flow rate of the pebbles through other portions of the bed, the flow down the opposite side of the bed being the most sluggish. This nonuniformity of pebble flow is responsible for nonuniformity of heating the gas feed and, when a reaction is being effected, results in nonuniform reaction and reduction in yield over that effected with uniform pebble flow.

It is found that by tilting or inclining a pebble furnace having an eccentric pebble inlet at an angle of about 2° to 15° with the vertical, the amount of tilt depending upon the design of the furnace, the character of the pebbles, etc., pebble flow through the furnace is materially improved and is substantially uniform throughout a cross-section of the bed with optimum tilt for a specific design of furnace. The angle of tilt or inclination required to effect the most nearly uniform flow is dependent upon the amount of eccentricity of the pebble inlet and the height of the pebble bed. The greater the eccentricity, the greater the angle of inclination required. For a given amount of eccentricity, the amount of inclination required decreases as the height of the pebble bed increases. The required inclination is also affected by the flow characteristics of the pebbles which determine the angle of repose and therefore the degree of slant of the pebble bed from the inlet to the opposite side. In general, the amount of inclination required increases slightly as the slant of the bed increases. An angle of inclination in the range of about 2° to 15° is sufficient to correct uneven pebble flow in any furnace of practical design. The furnace must, of course, be inclined or tilted so as to increase the horizontal deviation of the pebble inlet or highest point in the pebble bed from vertical alignment with the pebble outlet in the bottom of the bed.

Figure 2 illustrates the method of tilting or inclining furnace or reactor 10 according to the invention so as to improve the flow of pebbles therethrough, as can readily be seen.

It is found that a funnel shaped bottom also aids in effecting uniform pebble flow rate over a cross-section of the pebble bed and reduces or eliminates the sluggish flow areas near the periphery of the lower portion of the bed. The sides of the funnel should be at least about 50° with the horizontal and preferably 70° so as to completely eliminate sluggish flow areas near the juncture of the vertical sides and the funnel.

Another factor which affects the flow of pebbles through the furnace is the height of the pebble bed. Unless the average height of the bed is approximately one and one half times the diameter of the bed, it is found that the center continually tends to drop out of the bed thereby effecting increased flow rate through the center of the bed and sluggish flow in an annulus surrounding the central portion.

*Example I*

In studying the pebble flow pattern in a glass scale model furnace similar to that of the drawing and having a bottom sloping at about 70° with the horizontal, the furnace is filled with translucent so-called bead catalyst (1/8" spheres) containing about 1 per cent colored spheres and a continuous supply of the small pebbles is provided. The location of selected colored pebbles along a horizontal cross-section at the level of the top of the bed opposite the pebble inlet is noted and pebbles are allowed to freely flow through the outlet. The time required for the selected colored pebbles to reach the outlet is recorded and using the time for a pebble directly below the pebble inlet as unity, it takes a pebble in the outside of the bed directly opposite the inlet 2.1 times as long to reach the outlet and a pebble near the center of the bed 1.4 times as long.

*Example II*

Utilizing the technique of Example I but inclining the reactor approximately 5° so as to increase the horizontal deviation of the pebble inlet from vertical alignment with the pebble outlet, selected colored pebbles in the same horizontal plane taken as the starting line in Example I are found to arrive at the pebble outlet at subsantially the same time.

*Example III*

As an illustration of the utility of the invention, when a light paraffinic stream taken from a fractionation plant overhead and having the composition shown in the table is cracked in a pebble heater reactor of a design similar to that of the drawing having an I. D. of 5 feet and an average pebble bed depth of 8½ feet with an 8 inch I. D. pebble outlet, the reactor being inclined at an angle of 6° with the horizontal, by contact with a stream of hot ⅜ inch spherical alumina pebbles at a reaction temperature of 1800° F., an absolute pressure of 1 atmosphere, and a reaction time of .014 second, an effluent of the composition set forth in the table is produced.

| Component | Feed, Wt. Per Cent | Cracked Prods., Wt. Per Cent |
|---|---|---|
| $H_2$ | | 3.06 |
| $CH_4$ | 10.4 | 16.74 |
| $C_2H_2$ | | 1.15 |
| $C_2H_4$ | | 42.14 |
| $C_2H_6$ | 69.3 | 25.11 |
| $C_3H_4$ | | 0.24 |
| $C_3H_6$ | | 3.49 |
| $C_3H_8$ | 20.3 | 4.35 |
| $C_4H_6$ | | 1.94 |
| $C_4$ | | 0.83 |
| $C_5$ and heavier | | 0.95 |
| | 100.0 | 100.00 |

About 80 per cent of the propane and 64 per cent of the ethane in the feed is reacted.

Another method of improving pebble flow through a pebble furnace having a peripheral pebble inlet (disclosed and claimed in copending application Serial No. 591, by J. Frank Church, filed January 5, 1948), is to offset the pebble outlet from about 1/100 to 1/6 of the pebble bed diameter away from the inlet side of the furnace so as to place the more sluggish section of the pebble bed more directly over the pebble outlet.

The invention is not restricted to the conversion of hydrocarbons, but has wide application to the superheating of steam, air, nitrogen and other gases relatively nonreactive in the heater, as well as to other types of reactions which are advantageously performed at high temperatures.

The invention is applicable to any pebble furnace in which the pebbles are introduced eccentrically or nonaxially to the furnace so as to create an unsymmetrical pebble bed. The pebble inlet need not be positioned extremely eccentric, such as at the periphery of the furnace, for the invention to be effective in improving pebble flow. The invention improves pebble flow in any pebble furnace into which the pebbles are introduced at any degree of eccentricity to the axis of the furnace but the greatest improvement is effected where eccentricity of the pebble inlet is greatest.

Various modifications of the invention not described will become apparent to those skilled in the art. The illustrative details disclosed are not to be construed as imposing unnecessary limitations on the invention.

I claim:

1. In a process for heating a gas comprising continuously passing a contiguous mass of hot pebbles downwardly through a cylindrical zone having a ratio of height to diameter of at least 1.5 in contact with a stream of gas to be heated, wherein said pebbles are introduced to said zone eccentrically thereto and are withdrawn concentrically therewith, thereby effecting more rapid pebble flow from the point of introduction directly to the point of withdrawal of said pebbles than through other sections of said zone, the improvement comprising passing said mass of pebbles through said cylindrical zone so that the elements of said zone are inclined toward the point of introduction of pebbles at an angle of between about 2° and 15° from the vertical so as to improve pebble flow characteristics in said zone.

2. In a process for heating a gas comprising continuously passing a contiguous mass of hot pebbles downwardly through a cylindrical zone having a ratio of height to diameter of at least 1.5 in contact with a stream of gas to be heated, wherein said pebbles are introduced to said zone eccentrically thereto and are withdrawn concentrically therewith, thereby effecting more rapid pebble flow from the point of introduction directly to the point of withdrawal of said pebbles than through other sections of said zone, the method of effecting improved pebble flow comprising passing said mass of pebbles through said zone tilted from a vertical position in the range of 2° to 15° so as to increase the horizontal deviation of the point of introduction of pebbles from vertical alignment with the point of withdrawal thereof and thereby compensate for the eccentricity of the point of pebble introduction.

3. In a process for effecting the vapor phase conversion of hydrocarbons comprising continuously contacting a contiguous gravitating mass of hot pebbles in an inclosed cylindrical zone having a ratio of height to diameter of at least 1.5 with a stream of hydrocarbon vapor under conversion conditions of time, pressure, and temperature so as to effect conversion thereof, wherein said pebbles are introduced to the upper portion of said zone at a point eccentric thereto and are withdrawn from said zone axially thereto, thereby effecting more rapid pebble flow down the pebble inlet side of said zone with concomitant nonuniform heating and conversion of said hydrocarbon, the method of effecting improved pebble flow and hydrocarbon conversion comprising gravitating said mass of pebbles through said cylindrical zone positioned so that the elements of said zone are inclined toward the point of introduction of said pebbles at an angle in the range of 2° to 15° with the vertical which compensates for eccentricity of the point of pebble introduction.

4. The process of claim 3 in which pebbles are introduced at the periphery of said zone.

J. FRANK CHURCH.

REFERENCES CITED

The following references are of record in the file of this patent:

UNITED STATES PATENTS

| Number | Name | Date |
|---|---|---|
| 2,418,837 | Houdry | Apr. 15, 1947 |
| 2,429,359 | Kassel | Oct. 21, 1947 |